United States Patent [19]

Yamana et al.

[11] Patent Number: 5,804,674
[45] Date of Patent: Sep. 8, 1998

[54] MOLD RELEASE AGENT, CURED FILM OBTAINED FROM SAID MOLD RELEASE AGENT, AND MOLDING METHOD USING SAID MOLD RELEASE AGENT

[75] Inventors: Masayuki Yamana; Yasushi Nakamae; Hirotoshi Sakashita; Masato Kashiwagi, all of Osaka, Japan

[73] Assignee: Daikin Industries, Ltd., Osaka, Japan

[21] Appl. No.: 809,449

[22] PCT Filed: Oct. 19, 1995

[86] PCT No.: PCT/JP95/02146

§ 371 Date: Apr. 21, 1997

§ 102(e) Date: Apr. 21, 1997

[87] PCT Pub. No.: WO96/12600

PCT Pub. Date: May 2, 1996

[30] Foreign Application Priority Data

Oct. 21, 1994 [JP] Japan .................................. 6-256547

[51] Int. Cl.$^6$ ...................................................... C08F 8/00
[52] U.S. Cl. ........................ 525/477; 524/130; 524/131; 524/132; 525/100; 525/440; 525/444.5; 525/466; 525/476; 528/26; 528/27; 528/28
[58] Field of Search ...................... 524/130, 131, 524/132; 525/100, 440, 444.5, 466, 476, 477; 528/26, 27, 28

[56] References Cited

U.S. PATENT DOCUMENTS

| | | | |
|---|---|---|---|
| 4,118,235 | 10/1978 | Horiuchi et al. | 106/38.22 |
| 4,308,063 | 12/1981 | Horiuchi et al. | 106/38.22 |
| 4,427,803 | 1/1984 | Fukui et al. | 523/402 |
| 4,840,675 | 6/1989 | Fukui et al. | 106/38.22 |
| 4,923,945 | 5/1990 | Isozaki et al. | 528/16 |
| 4,972,027 | 11/1990 | Isozaki et al. | 525/365 |
| 5,026,793 | 6/1991 | Nakai et al. | 525/476 |
| 5,079,299 | 1/1992 | Hisamoto et al. | 525/100 |
| 5,492,968 | 2/1996 | Nakai et al. | 525/101 |
| 5,639,820 | 6/1997 | Kubo et al. | 524/758 |

*Primary Examiner*—James C. Housel
*Assistant Examiner*—Rodney P. Swartz
*Attorney, Agent, or Firm*—Birch, Stewart, Kolasch & Birch, LLP

[57] ABSTRACT

A mold release agent containing (A) a silane compound, (B) a silicon and/or fluorine-containing compound having at least two hydroxyl groups or alkoxy groups in one molecule and (C) a polymer of a perfluoroalkyl group-containing (meth)acrylate ester gives a long mold release life and a good surface finishing property of a molded article, and does not exert a harmful influence on fabricability such as painting and adhesion of the molded article.

8 Claims, No Drawings

MOLD RELEASE AGENT, CURED FILM OBTAINED FROM SAID MOLD RELEASE AGENT, AND MOLDING METHOD USING SAID MOLD RELEASE AGENT

FIELD OF THE INVENTION

The present invention relates to a mold release agent, a cured film obtained from said mold release agent, and a molding method using said mold release agent. More particularly, it relates to a mold release agent used for producing a molded article of a polymeric compound such as a synthetic resin and rubber, a cured film, and a molding method.

RELATED ART

In order to obtain a molded article of a resin or rubber, the molding is conducted after charging a resin or rubber material in a mold. Usually, a mold release agent is previously applied to the mold before charging.

As the mold release agent, waxes (e.g. a paraffin wax and a polyethylene wax), silicones (e.g. a polydimethylsiloxane oil and a silicone resin), organic compounds (e.g. glycol, a fatty acid derivative and a perfluoroalkyl group-containing compound) and inorganic compounds (e.g. a mineral oil, talc and mica) are used after dispersing or dissolving the mold release agent in water or an organic solvent.

Although these mold release agents are usually applied every time of the molding, it is required to develop a mold release agent having a prolonged release life to reduce the number of steps in view of the workability. A problem of mold contamination due to accumulation of the mold release agent is caused by applying every time. In case of a wax mold release agent, the degree of contamination is particularly intense. The main reason why the application of the mold release agent is required every time is that the mold release agent moves to the molded article, which gives the poor finishing such as tackiness of the molded article, the poor coating and poor adhesion to the molded article in the post step. Therefore, the washing with the organic solvent such as trichloroethane is conducted. Particularly, the silicone mold release agent causes the poor coating and poor adhesion.

In order to solve these drawbacks, various mold release agents have been developed. Examples thereof include a mixture of a $C_{4-20}$ perfluoroalkyl group-containing phosphate ester or a salt thereof and a silicone oil (Japanese Patent Kokoku Publication Nos. 23270/1978 and 23271/1978), a mixture of a $C_{4-20}$ perfluoroalkyl group-containing phosphate ester or a salt thereof and a silicone varnish (Japanese Patent Kokoku Publication No. 48035/1982), a mixture of a perfluoroalkyl group-containing polyether compound and a silicone oil (Japanese Patent Kokoku Publication No. 32513/1984) and the like. These are a preferred mold release agent which is superior in a mold release performance, and their mold release life is longer than that of a conventional one. The mold release agent comprising the mixture of the perfluoroalkyl group-containing polyether compound and the silicone oil exerts very small influence on the fabricability of almost all of polymeric compound molded articles. However, these mold release agents can not satisfy the mold release performance and mold release life which are required with complication of the shape and enlargement of the size of the polymeric molded article Japanese Patent Kokoku Publication No. 39804/1991 discloses a mold release agent containing a perfluoroalkyl group-containing acrylic polymer and a ladder polymer of organosilsesquioxane, as a curing film-forming type mold release agent having a prolonged release life. This mold release agent is superior in the initial release performance and the release life is prolonged to some degree. However, since a strength of the cured film is insufficient, a satisfactory release life is not obtained.

Furthermore, Japanese Patent Kokoku Publication No. 11605/1991 discloses a mold release agent containing polydimethylsiloxane, and an alkoxysilane represented by the formula:

$$(Z^1O)_vSIZ^2_{4-V}$$

wherein $Z^1$ is a methyl group, an ethyl group, a propyl group or a methoxyethyl group; $Z^2$ is a monovalent hydrocarbon group or halogenated hydrocarbon group having 1 to 4 carbon atoms; and v is 3 or 4, or an oligomer product obtained by partial hydrolysis or condensation of the alkoxysilane, and a metal alkoxide such as tetraalkyl titanate. However, this mold release agent is also insufficient in release life and fabricability. In these mold release agents forming a cured film, the film has no oil repellency, and they show poor mold releasability to, for example, a silicone rubber and an epoxy resin.

SUMMARY OF THE INVENTION

The present invention has been accomplished in view of the above problems. An object of the present invention is to provide a mold release agent which is superior in a release performance for various molding materials and gives a long mold release life, and which improves surface finishing properties of a molded article and does not exert a harmful influence on fabricability (secondary processing) such as the painting and adhesion of the molded article.

The present invention provides a mold release agent comprising a composition comprising:

(A) a silane compound represented by the general formula:

$$(R^1O)_nSiR^2_{4-n} \qquad (1)$$

a wherein $R^1$ is a hydrocarbon group or a halogenated hydrocarbon group, or $$-N=\overset{R^3}{\underset{|}{C}}-R^4$$

(each of $R^3$ and $R^4$ is a hydrocarbon group having 1 to 4 carbon atoms), $$-COR^5$$

($R^5$ is a hydrocarbon group having 1 to 4 carbon atoms) or $$-\overset{R^6}{\underset{|}{C}}=CH_2$$

($R^6$ is a hydrocarbon group having 1 to 4 carbon atoms); $R^2$ is a hydrocarbon group or halogenated hydrocarbon group having 1 to 4 carbon atoms; and n is 3 or 4;

(B) a silicon and/or fluorine-containing compound having at least two hydroxyl groups or alkoxyl groups in one molecule; and (C) a polymer of a perfluoroalkyl group-containing (meth) acrylate ester.

DETAILED DESCRIPTION OF THE INVENTION

The mold release agent of the present invention is used by forming a cured film in a mold. It is supposed that this cured film is formed by a deoximation, dealcoholation, decarboxylation or deketonation reaction of the mold release agent of the present invention, followed by a dehydration or dealcoholation reaction, thereby proceeding a crosslinking reaction.

In the silane compound (A) used in the present invention, $R^1$ may be a hydrocarbon group or a halogenated hydrocarbon group (alkoxy type). Specific examples of the hydrocarbon group include a methyl group, an ethyl group, a propyl group, a butyl group, an isopropyl group, an isobutyl group, a t-butyl group and the like. Specific examples of the halogenated hydrocarbon group include a trifluoropropyl group, a trichloroethyl group and the like. In view of the reactivity, a methyl or ethyl group is preferred. Alternatively, $R^1$ may be a group represented by the formula:

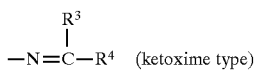

$$-N=C-R^4 \quad \text{(ketoxime type)}$$

(each of $R^3$ and $R^4$ is a hydrocarbon group having 1 to 4 carbon atoms. Specific examples thereof include a methyl group, an ethyl group, a propyl group, a butyl group, an isopropyl group, an isobutyl group, a t-butyl group and the like. In view of the reactivity, any one of $R^3$ and $R^4$ is preferably a methyl or ethyl group), or a group represented by the formula:

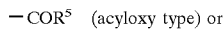

$-COR^5$ (acyloxy type) or

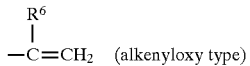

$-C=CH_2$ (alkenyloxy type)

(wherein each of $R^5$ and $R^6$ is a hydrocarbon group having 1 to 4 carbon atoms. Specific examples thereof include a methyl group, an ethyl group, a propyl group, a butyl group, an isopropyl group, an isobutyl group, a t-butyl group and the like. In view of the reactivity, a methyl or ethyl group is preferred.). A ketoxime type is most preferred as $R^1$ in view of the reactivity and availability of the raw material.

$R^2$ is a hydrocarbon group or halogenated hydrocarbon group having 1 to 4 carbon atoms. Examples the hydrocarbon group include a methyl group, an ethyl group, a propyl group, a butyl group, an isopropyl group, an isobutyl group, a t-butyl group and the like. Examples of the halogenated hydrocarbon group include a trifluoropropyl group, a trichloroethyl group and the like. Among them, a hydrocarbon group having 1 to 2 carbon atoms is preferred in view of the mold releasability and reactivity. Since n is 3 or 4, one or no $R^2$ group is present.

Specific examples of the silane compound (A) include the followings:

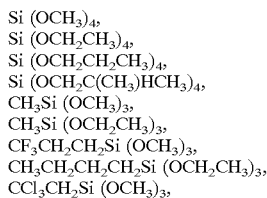

Si $(OCH_3)_4$,
Si $(OCH_2CH_3)_4$,
Si $(OCH_2CH_2CH_3)_4$,
Si $(OCH_2C(CH_3)HCH_3)_4$,
$CH_3Si$ $(OCH_3)_3$,
$CH_3Si$ $(OCH_2CH_3)_3$,
$CF_3CH_2CH_2Si$ $(OCH_3)_3$,
$CH_3CH_2CH_2CH_2Si$ $(OCH_2CH_3)_3$,
$CCl_3CH_2Si$ $(OCH_3)_3$,

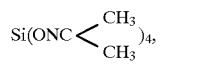
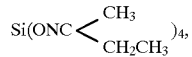
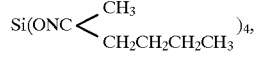
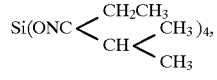
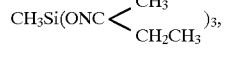
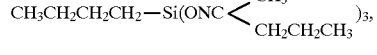
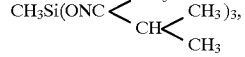

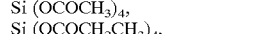
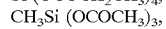
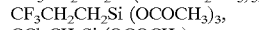
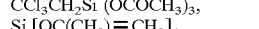
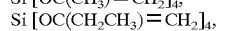
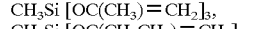

Si $(OCOCH_3)_4$,
Si $(OCOCH_2CH_3)_4$,
$CH_3Si$ $(OCOCH_3)_3$,
$CH_3Si$ $(OCOCH_2CH_3)_3$,
$CH_3CH_2Si$ $(OCOCH_3)_3$,
$CH_3CH_2CH_2Si$ $(OCOCH_2CH_3)_3$,
$CF_3CH_2CH_2Si$ $(OCOCH_3)_3$,
$CCl_3CH_2Si$ $(OCOCH_3)_3$,
Si $[OC(CH_3)=CH_2]_4$,
Si $[OC(CH_2CH_3)=CH_2]_4$,
$CH_3Si$ $[OC(CH_3)=CH_2]_3$,
$CH_3Si$ $[OC(CH_2CH_3)=CH_2]_3$,
$CH_3CH_2Si$ $[OC(CH_3)=CH_2]_3$,
$CH_3CH_2CH_2Si$ $[OC(CH_3)=CH_2]_3$,
$CF_3CH_2CH_2Si$ $[OC(CH_3)=CH_2]_3$,
$CCl_3CH_2Si$ $[OC(CH_3)=CH_2]_3$ and the like.

The silane compound (A) has an action of crosslinking the silicon and/or fluorine-containing compound (B).

The silicon and/or fluorine-containing compound (B) having at least two hydroxyl groups or alkoxyl groups in one molecule may be, for example, a compound represented by the formula (IIa):

wherein each of $X^3$ and $X^4$ is a hydrocarbon group or halogenated hydrocarbon having 1 to 4 carbon atoms or a phenyl group; each of $X^1$ and $X^2$ is a hydrogen atom or a hydrocarbon group having 1 to 4 carbon atoms; and m is not smaller than 10 on average.

As to $X^3$ and $X^4$, specific examples of the hydrocarbon group include a methyl group, an ethyl group, a propyl group, a butyl group, an isopropyl group, an isobutyl group, a t-butyl group and the like. Examples of the halogenated hydrocarbon group include a trifluoroethyl group, a trifluoropropyl group, a difluoroethyl group, a trichloropropyl group and the like. Among them, the methyl, ethyl, trifluoroethyl and trifluoropropyl groups are preferred in view of the reactivity and mold releasability.

Specific examples of $X^1$ and $X^2$ include —H, —CH$_3$, —CH$_2$CH$_3$, —CH$_2$CH$_2$CH$_3$, —CH(CH$_3$)$_2$ and —CH$_2$CH$_2$CH$_2$CH$_3$. Among them, —H and —CH$_3$ are preferred in view of the reactivity.

As the compound (IIa), those which are different in m may be used in combination. m is not smaller than 10 on average, preferably from 20 to 5,000, more preferably from 20 to 3,000, most preferably from 20 to 2,000, in view of the reactivity and mold releasability.

Specific examples of the compound (IIa) include the followings:

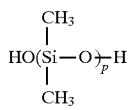

(p is from 20 to 5,000 on average)

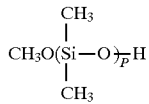

(p is from 20 to 2,000 on average)

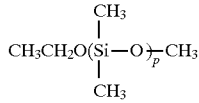

(p is from 20 to 2,000 on average)

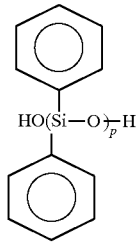

(p is from 20 to 2,000 on average)

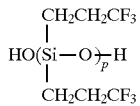

(p is from 20 to 2,000 on average)

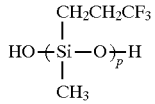

(p is from 20 to 2,000 on average).

The component (B) may be a compound represented by the formula (IIb):

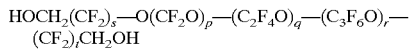
(IIb)

wherein p+q+r is not smaller than 5, preferably from 10 to 200, on average; and each of s and t is 1 or 2. In the compound (IIb), a CF$_2$O group, a C$_2$F$_4$O group and a C$_3$F$_6$O group are not necessarily positioned as described in the formula (IIb). For example, they may be arranged at random, or a block composed of these groups may be arranged in the order different from that described above.

As the compound (IIb), those which are different in p+q+r may be used in combination. p+q+r is not smaller than 5 on average, preferably from 10 to 200, more preferably from 10 to 100, most preferably from 10 to 50, in view of the reactivity.

Specific examples of the compound (IIb) include the followings:

HOCH$_2$(CF$_2$O)$_{10}$(CF$_2$CF$_2$O)$_{12}$CF$_2$CH$_2$OH,

HOCH$_2$CF$_2$CF$_2$O(CF$_2$CF$_2$CF$_2$O)$_{10}$CF$_2$CF$_2$(OCF$_2$CF$_2$CF$_2$)$_{10}$OCF$_2$CF$_2$CH$_2$OH,

HOCH$_2$CF$_2$CF$_2$O(CF$_2$CF$_2$CF$_2$O)$_{20}$CF$_2$CF$_2$(OCF$_2$CF$_2$CF$_2$)$_{20}$OCF$_2$CF$_2$CH$_2$OH,

HOCH$_2$CF(CF$_3$)O[CF$_2$CF(CF$_3$)O]$_{15}$CF$_2$CF$_2$[OCF(CF$_3$)CF$_2$]$_{15}$OCF(CF$_3$)CH$_2$OH.

The compound (B) ma be a compound represented by the formula (IIc):

$$Rf^1A^1Si(OA^2)_uA^3_{3-u} \quad (IIc)$$

wherein $Rf^1$ is a perfluoroalkyl group having 6 to 21 carbon atoms;

$A^1$ is an alkylene group having 2 to 6 carbon atoms;

$A^2$ is a hydrogen atom or an alkyl group having 1 to 4 carbon atoms;

$A^3$ is an alkyl group having 1 to 4 carbon atoms; and u is 2 or 3.

Specific examples of the $Rf^1$ group include CF$_3$(CF$_2$)$_5$—, CF$_3$(CF$_2$)$_7$—, CF$_3$(CF$_2$)$_9$—, CF$_3$(CF$_2$)$_{11}$—, CF$_3$(CF$_2$)$_{13}$—, CF$_3$(CF$_2$)$_{15}$—, CF$_3$(CF$_2$)$_{17}$—, CF$_3$(CF$_2$)$_{19}$—, (CF$_3$)$_2$CF(CF$_2$)$_4$—, (CF$_3$)$_2$CF(CF$_2$)$_6$—, (CF$_3$)$_2$CF(CF$_2$)$_8$—, (CF$_3$)$_2$CF(CF$_2$)$_{10}$—, (CF$_3$)$_2$CF(CF$_2$)$_{12}$—, (CF$_3$)$_2$CF(CF$_2$)$_{14}$—, (CF$_3$)$_2$CF(CF$_2$)$_{16}$— and (CF$_3$)$_2$CF(CF$_2$)$_{18}$—, Among them, CF$_3$(CF$_2$)$_7$—, CF$_3$(CF$_2$)$_9$—, CF$_3$(CF$_2$)$_{11}$— and CF$_3$(CF$_2$)$_{13}$— are preferred in view of the mold releasability.

Specific examples of $A^1$ include —CH$_2$—, —CH$_2$CH$_2$—, —CH$_2$CH$_2$CH$_2$CH$_2$—, —CH$_2$CH(CH$_3$)— and —(CH$_2$)$_6$— groups. Among them, —CH$_2$CH$_2$— and —CH$_2$— are preferred in view of the mold releasability.

Specific examples of $A^2$ include a hydrogen atom, a methyl group, an ethyl group, a propyl group, an isopropyl group, a butyl group and an isobutyl group. Among them, a hydrogen atom and a methyl group are preferred in view of the reactivity.

Specific examples of $A^3$ include a methyl group, an ethyl group, a propyl group, a butyl group, an isopropyl group and an isobutyl group. Among them, a methyl or ethyl group is preferred in view of the reactivity.

u is preferably 3 in view of the reactivity.

The component (B) may be a copolymer containing a compound represented by the formula (IId1):

(IId1)

wherein $Rf^2$ is a perfluoroalkyl group having 6 to 21 carbon atoms;

$A^4$ is an alkylene group having 1 to 6 carbon atoms; and $A^5$ is a hydrogen atom or a methyl group, and a compound represented by the formula (IId2):

$$H-O-A^6-O-\overset{O}{\underset{\|}{C}}-\overset{A^7}{\underset{|}{C}}=CH_2 \quad (IId2)$$

wherein $A^6$ is an alkylene group having 1 to 6 carbon atoms; and $A^7$ is a hydrogen atom or a methyl group, as a copolymerization component. A number average molecular weight of the copolymer is not smaller than 1000. The number average molecular weight is preferably not smaller than 3,000, particularly from 3,000 to 1,000,000, in view of the mold releasability.

Specific examples of $Rf^2$ are the same as those explained with respect to $Rf^1$ of the formula (IIc).

Specific examples of $A^4$ include —$CH_2$—, —$CH_2CH_2$—, —$CH_2CH_2CH_2CH_2$—, —$CH_2C(CH_3)H$— and —$(CH_2)_6$—. Among them, —$CH_2$— and —$CH_2CH_2$— are preferred in view of the mold releasability.

Specific examples of the compound (IId1) include the followings:

$CH_2$=$CHCO_2CH_2CH_2(CF_2)_7CF_3$,
$CH_2$=$C(CH_3)CO_2CH_2(CF_2)_9CF_3$,
$CH_2$=$CHCO_2(CH_2)_6(CF_2)_{15}CF_3$,
$CH_2$=$CHCO_2CH(CH_3)CH_2(CF_2)_8CF(CH_3)_2$,
$CH_2$=$C(CH_3)CO_2CH_2CH_2(CF_2)_{16}CF(CH_3)_2$ and
$CH_2$=$CHCO_2CH_2CH_2(CF_2)_4CF_3$.

Specific examples of $A^6$ include —$CH_2$—, —$CH_2CH_2$—, —$C(CH_3)HCH_2$— and —$(CH_2)_6$—.

Specific examples of the compound (IId2) include the followings:

$CH_2$=$CHCO_2CH_2CH_2OH$,
$CH_2$=$C(CH_3)CO_2(CH_2)_6OH$,
$CH_2$=$CHCO_2CH(CH_3)CH_2OH$,
$CH_2$=$CHCO_2CH_2CH_2CH_2OH$ and
$CH_2$=$CH(CH_3)CO_2CH_2CH_2OH$.

The compound (IId1) is contained in the copolymer in the amount of not smaller than 20% by weight, preferably not smaller than 40% by weight, more preferably not smaller than 80% by weight, in view of the mold releasability. A preferred upper limit is 98% by weight. When the amount is smaller than 20% by weight, the mold releasability is liable to become inferior.

The compound (IId2) is contained in the copolymer in the amount of not smaller than 2% by weight, preferably not smaller than 3% by weight, more preferably not smaller than 5% by weight, in view of the reactivity. A preferred upper limit is 20% by weight. When the amount is smaller than 2% by weight, the reactivity is liable to become inferior.

A copolymerization component of the above copolymer which may be used includes ethylene, propylene, vinyl chloride, vinylidene chloride, vinyl acetate, butyl vinyl ether and (meth)acrylates such as methyl (meth)acrylate, butyl (meth)acrylate, lauryl (meth)acrylate, stearyl (meth)acrylate, 2-ethylhexyl (meth)acrylate and glycidyl (meth)acrylate, in addition to the compounds (IId1) and (IId2). In view of the mold releasability, there may be preferably used (meth)acrylates of higher alcohols, such as lauryl (meth)acrylate, stearyl(meth)acrylate and 2-ethylhexyl (meth)acrylate.

Since the silicon and/or fluorine-containing compound (B) [the compound (IIa), the compound (IIb), the compound (IIc), or the copolymer of compound (II1) and compound (II2) which are the copolymerization components] has at least two hydroxyl groups or alkoxyl groups in one molecule, a cured film having excellent mold releasability can be obtained after the completion of the crosslinking reaction.

The above four kinds of compounds described as to the component (B) may be used alone or in combination, or different kinds of them may be used in combination.

The polymer (C) of a perfluoroalkyl group-containing (meth)acrylate ester will be explained hereinafter. Examples of the polymer (C) include a homopolymer of the following monomeric compound (IIIa) or a copolymer of the monomeric compounds (IIIa) and (IIIb).

The perfluoroalkyl group-containing (meth)acrylate ester polymer (C) may be a homopolymer of (C-1) a perfluoroalkyl group-containing (meth)acrylate ester monomer represented by the formula:

$$CH_2=\overset{B^1}{\underset{|}{C}}-COO-B^2-Rf^3 \quad (IIIa)$$

or a polymer obtained by copolymerizing the monomer (C-1) with (C-2) a (meth)acrylate ester monomer represented by the formula:

$$CH_2=\overset{B^3}{\underset{|}{C}}-COOB^4 \quad (IIIb)$$

wherein each of $B^1$ and $B^3$ is a hydrogen atom, a fluorine atom or a methyl group;

$B^2$ is an alkylene group having 1 to 6 carbon atoms;

$Rf^3$ is a perfluoroalkyl group having 6 to 21 carbon atoms; and $B^4$ is a hydrocarbon group having 1 to 24 carbon atoms or a glycidyl group.

The number average molecular weight of the homopolymer or copolymer may be from 1,000 to 1,000,000.

In the mold release agent, specific examples of $Rf^3$ are the same as those of $Rf^1$ and $Rf^2$.

Examples of the monomer (C-2) include methyl (meth)acrylate, butyl (meth)acrylate, lauryl (meth)acrylate, stearyl (meth)acrylate, 2-ethylhexyl (meth)acrylate, glycidyl (meth)acrylate and the like. In view of the mold releasability, (meth)acrylates of higher alcohols, such as lauryl (meth)acrylate, stearyl (meth)acrylate and 2-ethylhexyl (meth)acrylate are preferred. Particularly, acrylates are preferred.

The monomer (C-1) is contained in the copolymer in the amount of not smaller than 20% by weight, preferably not smaller than 40% by weight, more preferably not smaller than 80% by weight, in view of the mold releasability. The homopolymer in the amount of 100% by weight may be used. When the amount is smaller than 20% by weight, the mold releasability is liable to become poor. In the polymer, $Rf^3$ is not limited to one type and two or more types of $Rf^3$ may be used.

Although the monomer (C-2) is contained in the copolymer in the amount of at most 80% by weight, the preferred upper limit is 20% by weight.

As the copolymerization component of the above copolymer, ethylene, propylene, vinyl chloride, vinyl acetate, butyl vinyl ether, etc. may be contained, in addition to the monomers (C-1) and (C-2).

In the mold release agent of the present invention, the components which mainly contribute to the mold releasability are the silicon and/or fluorine-containing compound [the component (B)] and the perfluoroalkyl group-containing (meth)acrylate ester polymer [the component (C)].

The mold release agent of the present invention may optionally contain a curing accelerator, a solvent or the like, in addition to the components (A), (B) and (C).

The curing accelerator is appropriately added, for example, when the components (A), (B) and (C) have no or slow reaction. Examples of the curing accelerator include metal alkoxides such as tetraalkyl titanate, tetraalkyl germanate, tetraalkyl zirconate and vanadium trialkoxylate and organic acid salts such as zinc octylate and tin octylate.

As the solvent, there can be used those having no reactivity with the components (A), (B) and (C). Preferred examples of the solvent include an aliphatic hydrocarbon, an alicyclic hydrocarbon, an aromatic hydrocarbon, a halogenated hydrocarbon and a siloxane compound. Examples of the aliphatic hydrocarbon include hexane, heptane, octane, decane, isooctane and the like. Examples of the alicyclic hydrocarbon include cyclohexane and the like. Examples of the aromatic hydrocarbon include toluene, xylene, benzene, ethylbenzene and the like. Examples of the halogenated hydrocarbon include trichloroethane, trichlorotrifluoroethane, dichloromethane, dichloromonofluoroethane, perchloroethylene, perfluorohexane, HCFC-141b and the like. Examples of the siloxane compound include polysiloxane, cyclopolydimethylpolysiloxane and the like. It is also possible to use a ketone compound such as acetone, methyl ethyl ketone and methyl isobutyl ketone and an ester such as ethyl acetate and butyl acetate.

The weight ratio of the silane compound (A) to the silicon and/or fluorine-containing compound (B) is from 1/99 to 80/20, preferably from 2/98 to 40/60, more preferably from 2/98 to 30/70. When the weight ratio is smaller than 1/99 or larger than 80/20, a good crosslinked film is not formed and the mold releasability is liable to become inferior.

The weight ratio of the total amount of the silane compound (A) and silicon and/or fluorine-containing compound (B) to the perfluoroalkyl group containing (meth)acrylate ester polymer (C) (i.e. ((A)+(B))/(C) is from 99.95/0.05 to 20/80, preferably from 99.9/0.1 to 40/60, more preferably from 99.9/0.1 to 50/50. When the weight ratio is larger than 99.95/0.05, the oil repellency is poor so that the mold releasability is poor. On the other hand, when the weight ratio is smaller than 20/80, a good crosslinked film is not formed and duration of the mold releasability is liable to become poor.

The curing accelerator is used in the amount of 0 to 10% by weight, preferably from 1 to 7% by weight, based on the total amount of the components (A) and (B), although the amount varies depending on the reactivity between the components (A) and (B). When the amount is larger than 10% by weight, the mold releasability is liable to become poor.

When using the solvent, the amount of the solvent is adjusted so that the concentration of the component other than the solvent is 0.1–20% by weight, preferably 0.5–10% by weight, more preferably 1–10% by weight. When this concentration is smaller than 0.1% by weight, it is liable to become difficult to form a good mold release agent film. On the other hand, when the concentration is larger than 20% by weight, the viscosity becomes high so that it is difficult to conduct good application.

The mold release agent of the present invention can be obtained as an one-pack type, for example, by mixing the components (A), (B) and (C) and, if necessary, the solvent, the curing accelerator and other components at a room temperature. When the curing accelerator has high reactivity with the components (A) and (B), the mold release agent may be a two-pack type wherein the curing accelerator and a mixture of other components are separately stored.

For example, the one-pack type mold release agent of the present invention is applied to the inside of a mold at a room temperature by a brush or a spray to form a cured film of the present invention after heating or maintaining at a room temperature. The heating temperature varies depending on the type of materials, but is from 0° to 250° C., preferably from 20° to 200° C. When the heating temperature is lower than 0° C., the curing does not proceed easily. On the other hand, when the heating temperature is higher than 250° C., decomposition of the mold release agent component may arise. In case of the two-pack type, the curing accelerator is mixed with the other components immediately before the use, and the mixture is applied to the inside of the mold by a brush or a spray and then optionally heated to form a cured film of the present invention. The heating temperature varies depending on the kind of materials, but is usually from 0° to 250° C., preferably from 20° to 200° C. When the heating temperature is lower than 0° C., the curing does not proceed easily. On the other hand, when the heating temperature is higher than 250° C., decomposition of the mold release agent component may arise. A film thickness of the cured film of the present invention is not specifically limited, but is preferably from 0.1 to 100 μm, particularly from 0.2 to 20 μm, more preferably from 0.5 to 10 μm, in view of good mold releasability, in both of the one-pack and two-pack types.

It is supposed that the mold release agent of the present invention is cured by the reaction between the components (A) and (B). Firstly (1) a dealcoholation, deoximation, decarboxylation or deketonation reaction arises, and then (2) a dehydration reaction or dealcoholation reaction arisesm so that the crosslinking reaction proceeds.

(1) Dealcoholation, deoximation, decarboxylation or deketonation reaction

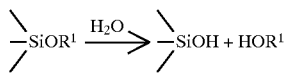

(2) Dehydration reaction (crosslinking reaction)

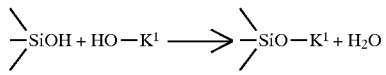

or dealcoholation reaction (crosslinking reaction)

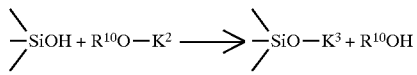

wherein $R^1$ is as defined above; and each of HO—$K^1$ and $R^{10}$O—$K^2$ ($R^{10}$ is a hydrocarbon group having 1 to 4 carbon atoms) is the above-described silicon and/or fluorine-containing compound having at least two hydroxyl groups or alkoxy groups in one molecule.

It is supposed that a cured film having sufficient durability can be obtained by incorporating the component (C) (to be added to the components (A) and (B)) into a crosslinked compound when the crosslinking reaction (2) in the above reaction scheme proceeds. The reason why the mold release agent film shows an oil repellency is supposed that a perfluoroalkyl group is localized on the surface or at the vicinity of the surface of the cured film at the stage when the component (C) is incorporated into the cured compound.

The following molding method may be carried out by using the mold release agent of the present invention. The mold release agent is applied to the internal surface of a mold and the mold release agent is cured to form a cured film in the mold. Then, a molding composition is charged in the mold and, after molding the molding composition into a molded article, the molded article is removed from the mold. The mold release agent of the present invention serves as an external mold release agent.

Examples of the mold, for which the mold release agent of the present invention is used, include molds made of aluminum, SUS, iron, an epoxy resin, a wood, etc. and nickel electro-formed or chromium-plated molds.

Examples of the molded article to be demolded by the mold release agent of the present invention include molded articles obtained by using a molding composition comprising a thermosetting resin (e.g. a urethane foam, an epoxy resin, a phenol resin and FRP) and a rubber (e.g. a urethane rubber, H-NBR, NBR, a silicone rubber, EPDM, CR, NR, a fluororubber, SBR, BR, IIR and IR).

The mold release agent of the present invention can be used after charging into an aerosol container by using a propellant. Examples of the propellant include an aliphatic hydrocarbon, an halogenated hydrocarbon, carbon dioxide, nitrogen and the like. Examples of the aliphatic hydrocarbon include propane, butane, LPG, dimethyl ether and the like. Examples of the halogenated hydrocarbon include R-11, R-12, HFC-134a, HCFC-142b, HCFC-22, HCFC-141b and the like. The amount of propellant is from 10 to 95% by weight, preferably from 20 to 90% by weight, more preferably from 30 to 90% by weight, based on the total amount of the mold release agent and propellant. When the amount is smaller than 10% by weight, it is liable to be impossible to propel satisfactorily so that it is impossible to form a uniform film. On the other hand, when the amount is larger than 95% by weight, the film becomes thin so that the mold releasability is liable to be lowered.

PREFERRED EMBODIMENT OF THE INVENTION

The present invention will be illustrated by the following Examples and Comparative Examples, which do not limit the present invention.

in the following Examples and Comparative Examples, "parts" and "percentages" are by weight unless otherwise specified.

EXAMPLE 1

20 parts by weight of $CH_3Si[ON=C(CH_3)CH_2CH_3]_3$ as a silane compound, 75 parts by weight of

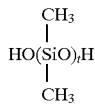

(average value of t is 1000) as a silicon and/or fluorine-containing compound having at least two hydroxyl groups or alkoxyl groups in one molecule, 3 parts by weight of tin octylate as a curing accelerator, 2 parts by weight of a perfluoroalkyl group-containing (meth)acrylate ester copolymer obtained from the following monomers:

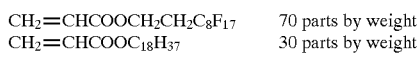

and HCFC-141b and isooctane (weight ratio: 90/5) as a solvent were mixed to prepare a mold release agent of the present invention. Amounts of HCFC-141b and isooctane contained in the mold release agent were 90% and 5%, respectively, so that the total concentration of the other four components was 5%.

This mold release agent was subjected to a mold releasability test of urethane and a mold releasability test of an epoxy resin. Furthermore, a contact angle was also measured. In the mold mold releasability test, a film thickness was about 2.5 $\mu$m.

[Urethane releasability test] (mold release performance and mold release life of mold release agent)

A mold release agent was applied to an aluminum mold having an internal size of 6 cm (diameter)×1 cm by a brush, and then the mold release agent was cured by heating the mold at 150° C. for 10 minutes to form a cured film on the inside of the mold.

A urethane composition having the following components was casted into this mold after sufficiently mixing by a mixer.

| | |
|---|---|
| Sunyrex FA 912 | 100 Parts |
| (a polyol manufactured by Sanyo Chemical Industries, Ltd.) | |
| Ethylene glycol | 19 Parts |
| R-11 (trichloromonofluoromethane) | 5 Parts |
| DABCO | 0.9 Parts |
| (1,4-diazabicyclo[2,2,2] octane) | |
| dibutyltin laurate | 0.025 Parts |
| Milionate MTL | 104 Parts |
| (an isocyanate, manufactured by Nippon Polyurethan Co., Ltd.) | |

After a urethane molded article was produced by curing at a room temperature for 10 minutes, a tensile force T (g/cm$^2$) was measured by drawing pins which were previously positioned in the urethane composition during the molding by a tensile testing machine (separation rate: 20 mm/min.). Then, the mold release performance was evaluated according to the following criteria. The results are shown in Table 3.

A: T≦100 g/cm$^2$
B: 100 g/cm$^2$<T≦200 g/cm$^2$
C: 200 g/cm$^2$<T≦300 g/cm$^2$
D: 300 g/cm$^2$<T

Then, a step of molding and demolding the urethane composition in a mold without applying the mold release agent was repeated up to 50 times. The release performance after molding 10 times, 30 times and 50 times was also evaluated, respectively. The results are shown in Table 3.

[Epoxy resin releasability test]

A mold release agent was applied to an aluminum mold having an internal size of 6 cm (diameter)×1 cm by a brush, and then the mold release agent was cured by heating the mold at 150° C. for 10 minutes to form a cured film on the inside of the mold.

The following epoxy resin composition was casted into this mold after sufficiently mixing by a spatula.

| | |
|---|---|
| Epikote 828 | 100 Parts |
| (an epoxy resin, manufactured by Yuka Shell Co., Ltd.) | |
| Triethylenetetramine | 8 Parts |

After the epoxy resin composition was cured at 120° C. for 60 minutes, a tensile force T(g/cm$^2$) was measured by drawing pins which were previously positioned in the epoxy resin composition during the molding by a tensile testing machine (a separation rate: 20 mm/min.). Then, the release performance was evaluated according to the following criteria.

A: T≦100 g/cm²
B: 100 g/cm²<T≦200 g/cm²
C: 200 g/cm²<T≦300 g/cm²
D: 300 g/cm²<T

The results of the release performance are shown in Table 3.

Then, a step of molding and demolding the epoxy resin in the mold without applying a mold release agent again was repeated up to 50 times. The release performance after molding 10 times, 30 times and 50 times was also evaluated, respectively. The results are shown in Table 3.

[Measurement of contact angle]

A mold release agent was applied to an aluminum plate having a size of 50 mm×20 mm×1 mm by a brush, and then the mold release agent was cured by heating at 150° C. for 10 minutes to form a cured film on the aluminum plate. A contact angle of water or n-hexadecane on this aluminum plate was measured at 25° C. As a device for measuring the contact angle, CA-DT, Model A manufactured by Kyowa Kaimen Kagaku Co., Ltd. was used. The results are shown in Table 3.

EXAMPLES 2 to 16

According to the same manner as in Example 1 except for changing the silane compound, silicon and/or fluorine-containing compound, polymer of a perfluoroalkyl group-containing (meth)acrylate, curing accelerator and solvent as shown in Table 1, a mold release agent of the present invention was prepared. According to the same manner as in Example 1 except for changing the curing conditions as shown in Table 1, a cured film was formed. A film thickness was from 0.5 to 5.0 μm. These are subjected to the urethane releasability test, the epoxy resin releasability test and the contact measuring test according to the same manner as in Example 1.

In Example 9, a mixture of HCFC-141b, isooctane and cyclopolydimethylsiloxane represented by the formula:

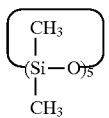

in weight ratio of 45:5:50 was used. In Examples 14 and 16, three types of compounds shown in Table 1 were used in combination as the silicon and/or fluorine-containing compound. The results are shown in Table 3.

Comparative Examples 1 to 8

According to the same manner as in Example 1 except for changing the components as shown in Table 2, a mold release agent was prepared. According to the same manner as in Example 1 except for changing the curing conditions as shown in Table 2, a cured film was formed. A film thickness was from 0.5 to 30 μm. These are subjected to the urethane releasability test, the epoxy resin releasability test and the contact measuring test according to the same manner as in Example 1.

The results are shown in Table 3. Regarding those which were evaluated as "D" in the releasability test, the times of mold release are shown in parentheses.

TABLE 1

| Example No. | Silane compound Type | % | Silicon and/or fluorine-containing compound Type | % | Polymer of Rf group-containing acrylate ester Type | % | Curing accelerator Type | % | Total concentration of four components % | Solvent Type | % | Curing conditions °C. | Minutes |
|---|---|---|---|---|---|---|---|---|---|---|---|---|---|
| 1 | i-1 | 20 | ii-1 | 75 | iii-1 | 2 | iv-1 | 3 | 5 | v-1 | 95 | 150 | 10 |
| 2 | i-1 | 40 | ii-2 | 50 | iii-1 | 8 | iv-1 | 2 | 5 | v-1 | 95 | 30 | 100 |
| 3 | i-1 | 3 | ii-3 | 87 | iii-1 | 5 | iv-1 | 5 | 5 | v-1 | 95 | 100 | 20 |
| 4 | i-1 | 10 | ii-4 | 80 | iii-1 | 3 | iv-1 | 7 | 5 | v-1 | 95 | 200 | 5 |
| 5 | i-2 | 20 | ii-5 | 70 | iii-2 | 5 | iv-1 | 5 | 1 | v-1 | 99 | 150 | 10 |
| 6 | i-3 | 17 | ii-5 | 75 | iii-3 | 3 | iv-1 | 5 | 2 | v-1 | 98 | 150 | 10 |
| 7 | i-4 | 20 | ii-5 | 60 | iii-4 | 10 | — | 0 | 3 | v-1 | 97 | 150 | 30 |
| 8 | i-5 | 10 | ii-5 | 70 | iii-5 | 15 | iv-1 | 5 | 10 | v-1 | 90 | 100 | 20 |
| 9 | i-1 | 20 | ii-6 | 70 | iii-6 | 5 | iv-2 | 5 | 5 | v-2 | 95 | 150 | 10 |
| 10 | i-2 | 20 | ii-7 | 70 | iii-7 | 5 | iv-1 | 5 | 5 | v-1 | 95 | 150 | 20 |
| 11 | i-1 | 20 | ii-8 | 70 | iii-1 | 5 | iv-1 | 5 | 5 | v-3 | 95 | 150 | 20 |
| 12 | i-1 | 40 | ii-9 | 50 | iii-1 | 5 | iv-1 | 5 | 5 | v-3 | 95 | 150 | 20 |
| 13 | i-1 | 50 | ii-10 | 42 | iii-1 | 5 | iv-1 | 3 | 5 | v-3 | 95 | 150 | 20 |
| 14 | i-2 | 15 | ii-11 | 75 | iii-8 | 5 | iv-2 | 5 | 5 | v-3 | 95 | 150 | 20 |
| 15 | i-1 | 10 | ii-12 | 80 | iii-3 | 5 | iv-2 | 5 | 5 | v-4 | 95 | 150 | 20 |
| 16 | i-1 | 10 | ii-13 | 80 | iii-3 | 5 | iv-2 | 5 | 5 | v-4 | 95 | 100 | 30 |

TABLE 2

| Comparative Example No. | Compound Type | % | Compound Type | % | Curing accelerator Type | % | Total concentration of three compounds % | Solvent Type | % | Curing conditions °C. | Minutes |
|---|---|---|---|---|---|---|---|---|---|---|---|
| 1 | Silane compound i-4 | 20 | Compound ii-11 | 75 | iv-1 | 5 | 5 | v-1 | 95 | 150 | 10 |

TABLE 2-continued

| Comparative Example No. | Compound Type | % | Compound Type | % | Curing accelerator Type | % | Total concentration of three compounds % | Solvent Type | % | Curing conditions °C. | Minutes |
|---|---|---|---|---|---|---|---|---|---|---|---|
| 2 | Silane compound i-4 | 30 | Compound ii-12 | 70 | — | 0 | 3 | v-1 | 97 | 100 | 30 |
| 3 | Silane compound i-5 | 20 | Compound ii-13 | 75 | iv-1 | 5 | 5 | v-1 | 95 | 100 | 30 |
| 4 | Compound i-11 | 20 | Compound ii-14 | 75 | iv-1 | 5 | 5 | v-1 | 95 | 150 | 10 |
| 5 | Compound i-12 | 100 | — | 0 | — | 0 | 5 | v-11 | 95 | — | — |
| 6 | Compound i-13 | 100 | — | 0 | — | 0 | 5 | v-11 | 95 | — | — |
| 7 | Compound i-14 | 100 | — | 0 | — | 0 | 6 | v-12 | 94 | — | — |
| 8 | Compound i-15 | 20 | Compound ii-15 | 75 | iv-1 | 5 | 1 | v-12 | 99 | 150 | 10 |

Note)
Silane compound i-1:

$$CH_3Si[ON{=}C(CH_3)CH_2CH_3]_3$$

Silane compound i-2:

$$CH_3Si[ON{=}C(CH_3)_2]_3$$

Silane compound i-3:

$$CH_3CH_2CH_2Si[ON{=}C(CH_3)_2]_3$$

Silane compound i-4:

$$Si(OCH_3)_4$$

Silane compound i-5;

$$CCl_3CH_2CH_2Si(OCH_3)_3$$

Silicon and/or fluorine-containing compounds ii-1, ii-2, i-3, ii-4, ii-5, ii-6 and ii-7:

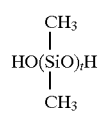

ii-1; average of t is 1,000
ii-2; average of t is 25
ii-3; average of t is 800
ii-4; average of t is 3,500
ii-5; average of t is 100
ii-6; average of t is 500
ii-7; average of t is 300

Silicon and/or fluorine-containing compound ii-8:
FOMBLIN Z DOL (a perfluoropolyether compound having alkoxyl groups at both terminal ends, manufactured by Nippon Montedison Co.)

Silicon and/or fluorine-containing compound ii-9:

$$C_8F_{17}CH_2CH_2Si(OCH_3)_3$$

Silicon and/or fluorine-containing compound ii-10:

$$C_{15}F_{31}CH_2CH_2Si(OH)_3$$

Silicon and/or fluorine-containing compound ii-11:

a copolymer having an average molecular weight of 50,000 obtained from the followings:

| $C_8H_{17}CH_2CH_2OCOCH{=}CH_2$ | 70% |
| $HOCH_2CH_2OCOC(CH_3){=}CH_2$ | 10% |
| $C_{18}H_{37}OCOCH{=}CH_2$ | 20% |

Silicon and/or fluorine-containing compound ii-12:

$$HOCH_2CF_2CF_2(OCF_2CF_2CF_2)_{20}CF_2CF_2CH_2OH$$

Silicon and/or fluorine-containing compound ii-13:

a copolymer having an average molecular weight of 100,000 obtained from the followings:

| $C_{10}F_{21}CH_2CH_2OCOC(CH_3){=}CH_2$ | 85% |
| $HO(CH_2)_3COCH{=}CH_3$ | 15% |

Rf group-containing acrylate ester polymer iii-1:

a copolymer having an average molecular weight of 10,000 obtained from the followings:

| $C_8F_{17}CH_2CH_2OCOCH{=}CH_2$ | 85% |
| $C_{18}H_{37}OCOCH{=}CH_2$ | 15% |

Rf group-containing acrylate ester polymer iii-2:

a copolymer having an average molecular weight of 10,000 obtained from the followings:

| $C_8F_{17}CH_2CH_2OCOCH{=}CH_2$ | 90% |
| $C_{18}H_{37}OCOCH{=}CH_2$ | 10% |

Rf group-containing acrylate ester polymer iii-3:

a homopolymer having an average molecular weight of 10,000 obtained from the following:

$$C_8F_{17}CH_2CH_2OCOCH{=}CH_2$$

Rf group-containing acrylate ester polymer iii-4:

a copolymer having an average molecular weight of 10,000 obtained from the followings:

C$_8$F$_{17}$CH$_2$CH$_2$OCOCH=CH$_2$ 95%

C$_4$H$_9$(C$_2$H$_5$)CHCH$_2$OCOC(CH$_3$)=CH$_2$ 5%

Rf group-containing acrylate ester polymer iii-5:
a copolymer having an average molecular weight of 10,000 obtained from the followings:

C$_8$F$_{17}$CH$_2$CH$_2$OCOCH=CH$_2$ 80%

C$_{18}$H$_{37}$OCOCH=CH$_2$ 15%

C$_4$H$_9$(C$_2$H$_5$)CHCH$_2$OCOC(CH$_3$)=CH$_2$ 5%

Rf group-containing acrylate ester polymer iii-6:
a copolymer having an average molecular weight of 10,000 obtained from the followings:

C$_8$F$_{17}$CH$_2$CH$_2$OCOC(CH$_3$)=CH$_2$ 80%

C$_{18}$H$_{37}$OCOCH=CH$_2$ 20%

Rf group-containing acrylate ester polymer iii-7:
a copolymer having an average molecular weight of 10,000 obtained from the followings:

C$_9$F$_{19}$CH$_2$CH$_2$OCOCH=CH$_2$ 95%
CH$_2$CHCH$_2$OCOC(CH$_3$)=CH$_2$ 5%
O Rf group-containing acrylate ester polymer iii-8:
a copolymer having an average molecular weight of 10,000 obtained from the followings:

C$_8$F$_{17}$CH$_2$CH$_2$OCOCH=CH$_2$ 90%
C$_{17}$H$_{35}$OCOCH=CH$_2$ 10%

Curing accelerator iv-1:
  tin octylate
Curing accelerator iv-2:
  tetra(2-ethylhexyl)titanate
Solvent v-1:
  HCFC-141b/isooctane (weight ratio: 90/5)
Solvent v-2:
  HCFC-141b/isooctane/cyclopolydimethylsiloxane (weight ratio: 45/5/50)
Solvent v-3:
  trichlorotrifluoroethane
Solvent v-4:
  perfluorohexane
Compound i-11:
  Si(OCH$_2$CH$_3$)$_4$
Compound i-12:
  SH-200 (dimethylsiloxane oil manufactured by Toray Dow Corning Silicone Co., Ltd., 350 cs)
Compound i-13:
  SH-7020 (silicone resin manufactured by Toray Dow Corning Silicone Co., Ltd.)
Compound i-14:
  carnauba wax
Compound i-15:
  Si[OCH$_2$CH$_2$C(CH$_3$)HCH$_3$]$_4$
Compounds ii-11, ii-12, ii-13, ii-14 and ii-15:

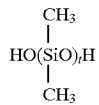

ii-11; average of t is 1,000
ii-12; average of t is 50
ii-13; average of t is 300
ii-14; average of t is 200
ii-15; average of t is 100
Solvent v-11:
  trichlorotrifluoroethane
Solvent v-12:
  toluene

TABLE 3

| | Urethane releasability | | | | Epoxy releasability | | | | Contact angle | |
|---|---|---|---|---|---|---|---|---|---|---|
| | Fist time | Ten times | Thirty times | Fifty times | Fist time | Ten times | Thirty times | Fifty times | Water | n-Hexadecane |
| Example No. | | | | | | | | | | |
| 1 | A | A | A | A | A | A | A | A | 121 | 78 |
| 2 | A | A | A | B | A | A | A | A | 120 | 79 |
| 3 | A | A | A | A | A | A | A | B | 121 | 82 |
| 4 | A | A | A | B | A | A | A | A | 121 | 80 |
| 5 | A | A | A | A | A | A | A | A | 120 | 78 |
| 6 | A | A | A | A | A | A | A | B | 122 | 79 |
| 7 | A | A | B | C | A | A | B | C | 120 | 81 |
| 8 | A | A | B | C | A | A | B | C | 121 | 80 |
| 9 | A | A | A | A | A | A | A | A | 120 | 80 |
| 10 | A | A | A | A | A | A | A | A | 120 | 78 |
| 11 | A | A | A | A | A | A | A | A | 120 | 80 |
| 12 | A | A | A | B | A | A | A | B | 120 | 80 |
| 13 | A | A | A | B | A | A | A | B | 120 | 79 |
| 14 | A | A | A | B | A | A | A | B | 121 | 81 |
| 15 | A | A | A | A | A | A | A | A | 120 | 80 |
| 16 | A | A | A | B | A | A | A | B | 120 | 79 |

TABLE 3-continued

| | Urethane releasability | | | | Epoxy releasability | | | | Contact angle | |
|---|---|---|---|---|---|---|---|---|---|---|
| | Fist time | Ten times | Thirty times | Fifty times | Fist time | Ten times | Thirty times | Fifty times | Water | n-Hexadecane |
| Comparative Example No. | | | | | | | | | | |
| 1 | A | A | B | D(35) | C | D(2) | — | — | 106 | can not be measured |
| 2 | A | B | D(21) | — | C | D(2) | — | — | 108 | can not be measured |
| 3 | A | D(8) | — | — | C | D(2) | — | — | 108 | can not be measured |
| 4 | A | D(7) | — | — | C | D(2) | — | — | 110 | can not be measured |
| 5 | C | D(2) | — | — | C | D(2) | — | — | 102 | can not be measured |
| 6 | B | D(5) | — | — | C | D(2) | — | — | 106 | can not be measured |
| 7 | B | D(2) | — | — | C | D(2) | — | — | 107 | can not be measured |
| 8 | A | A | B | D(30) | C | D(2) | — | — | 108 | can not be measured |

We claim:

1. A mold release agent comprising a composition comprising:

(A) a silane compound represented by the general formula:

$$(R^1O)_n SiR^2_{4-n} \quad (I)$$

wherein $R^1$ is a hydrocarbon group or a halogenated hydrocarbon group, or

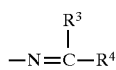

(each of $R^3$ and $R^4$ is a hydrocarbon group having 1 to 4 carbon atoms),
—COR$^5$
($R^5$ is a hydrocarbon group having 1 to 4 carbon atoms) or

($R^6$ is a hydrocarbon group having 1 to 4 carbon atoms);
$R^2$ is a hydrocarbon group or halogenated hydrocarbon group having 1 to 4 carbon atoms; and
n is 3 or 4;

(B) a silicon and/or fluorine-containing compound having at least two hydroxyl group or alkoxyl groups in one molecule; and (C) a polymer of a perfluoroalkyl group-containing (meth)acrylate ester.

2. The mold release agent according to claim 1, wherein a weight ratio [((A)+(B))/(C)] of the total amount of the component (A) and component (B) to the amount of the component (C) is from 99.95/0.05 to 50/50.

3. The mold release agent according to claim 1 or 2, wherein a weight ratio of the component (A) to the component (B) is from 1/99 to 80/20.

4. The mold release agent according to claim 1, wherein the silicon and/or fluorine-containing compound (B) is at least one compound selected from the group consisting of:

(i) a compound represented by the formula:

wherein each of $X^3$ and $X^4$ is a hydrocarbon group or halogenated hydrocarbon group having 1 to 4 carbon atoms or a phenyl group;

each of $X^1$ and $X^2$ is a hydrogen atom or a hydrocarbon group having 1 to 4 carbon atoms; and m is not smaller than 10, preferably from 20 to 5,000, on average;

(ii) a compound represented by the formula:

$$HOCH_2(CF_2)_s\text{—}O(CF_2O)_p\text{—}(C_2F_4O)_q\text{—}(C_3F_6O)_r\text{—}(CF_2)_tCH_2OH \quad (IIb)$$

wherein p+q+r is not smaller than 5, preferably from 10 to 200, on average; and each of s and t is 1 or 2;

(iii) a compound represented by the formula:

$$Rf^1A^1Si(OA^2)_u A^3_{3-u} \quad (IIc)$$

wherein $Rf^1$ is a perfluoroalkyl group having 6 to 21 carbon atoms;

$A^1$ is an alkylene group having 2 to 6 carbon atoms;

$A^2$ is a hydrogen atom or an alkyl group having 1 to 4 carbon atoms;

$A^3$ is an alkyl group having 1 to 4 carbon atoms; and u is 2 or 3; and (iv) a copolymer comprising a compound represented by the formula:

wherein $Rf^2$ is a perfluoroalkyl group having 6 to 21 carbon atoms;

$A^4$ is an alkylene group having 1 to 6 carbon atoms; and $A^5$ is a hydrogen atom or a methyl group, and a compound represented by the formula:

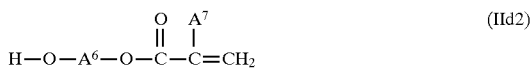

wherein $A^6$ is an alkylene group having 1 to 6 carbon atoms; and $A^7$ is a hydrogen atom or a methyl group, as a copolymerization component.

5. The mold release agent according to claim 1, wherein the perfluoroalkyl group-containing (meth)acrylate ester polymer (C) is a homopolymer obtained from (C-1) a perfluoroalkyl group-containing (meth)acrylate ester monomer represented by the formula:

or a polymer obtained by copolymerizing the monomer (C-1) with (C-2) a (meth)acrylate ester monomer represented by the formula:

wherein each of $B^1$ and $B^3$ is a hydrogen atom, a fluorine atom or a methyl group;

$B^2$ is an alkylene group having 1 to 6 carbon atoms;

$Rf^3$ is a perfluoroalkyl group having 6 to 21 carbon atoms; and $B^4$ is a hydrocarbon group having 1 to 24 carbon atoms or a glycidyl group.

6. The mold release agent according to claim 5, wherein a weight ratio of the perfluoroalkyl group-containing (meth)acrylate ester monomer (C-1) to the (meth)acrylate ester monomer (C-2) is from 100/0 to 20/80 in the component (C).

7. A cured film obtained by applying the mold release agent of claim 1 to an internal surface of a mold and curing the mold release agent.

8. A molding method, which comprises applying the mold release agent of claim 1 to an internal surface of a mold; curing the mold release agent to form a cured film in the mold; charging a molding composition in the mold; molding the molding composition to a molded article; and demolding the molded article from the mold.

* * * * *